(12) United States Patent
Elmufdi et al.

(10) Patent No.: US 9,646,120 B1
(45) Date of Patent: May 9, 2017

(54) METHOD AND SYSTEM FOR TRACE COMPACTION DURING EMULATION OF A CIRCUIT DESIGN

(71) Applicant: CADENCE DESIGN SYSTEMS, INC., San Jose, CA (US)

(72) Inventors: Beshara Elmufdi, San Jose, CA (US); Mitchell G. Poplack, San Jose, CA (US); Viktor Salitrennik, Berkeley, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 15/158,933

(22) Filed: May 19, 2016

Related U.S. Application Data

(62) Division of application No. 14/500,899, filed on Sep. 29, 2014, now Pat. No. 9,372,947.

(51) Int. Cl.
*G06F 17/50* (2006.01)

(52) U.S. Cl.
CPC ...... *G06F 17/5027* (2013.01); *G06F 2217/68* (2013.01); *G06F 2217/86* (2013.01)

(58) Field of Classification Search
CPC .............. G06F 17/5027; G06F 2217/68; G06F 2217/86
See application file for complete search history.

(56) References Cited

U.S. PATENT DOCUMENTS

| | | | |
|---|---|---|---|
| 4,782,461 A | 11/1988 | Mick | |
| 5,535,331 A * | 7/1996 | Swoboda | G06F 15/786 712/E9.016 |
| 5,572,710 A * | 11/1996 | Asano | G06F 17/5027 703/15 |
| 6,035,117 A * | 3/2000 | Beausoleil | G06F 17/5027 703/25 |
| 6,618,698 B1 | 9/2003 | Beausoleil | |
| 7,055,078 B2 | 5/2006 | Kwon | |
| 7,080,283 B1 | 7/2006 | Songer | |
| 7,379,861 B2 | 5/2008 | Kfir | |
| 7,562,258 B2 | 7/2009 | Williams | |
| 7,571,364 B2 | 8/2009 | Whetsel | |
| 7,725,304 B1 * | 5/2010 | Beausoleil | G06F 17/5027 703/23 |
| 7,739,093 B2 | 6/2010 | Beausoleil | |
| 8,090,568 B2 | 1/2012 | Beausoleil | |
| 8,099,273 B2 | 1/2012 | Selvidge | |
| 8,407,528 B2 | 3/2013 | Larson | |

(Continued)

*Primary Examiner* — Naum B Levin
(74) *Attorney, Agent, or Firm* — Arnold & Porter Kaye Scholer LLP

(57) ABSTRACT

The present patent document relates to a method to compact trace data generated by emulation processors during emulation of a circuit design, and a hardware functional verification system that compacts trace data. Compaction logic within emulation processor clusters accumulated data bits output from the emulation processors and compacts them into trace data bytes in registers based on enable bits identifying valid trace data according to a compaction scheme. Trace data bytes are further accumulated and compacted into larger trace data bytes in higher level processor clusters of the emulation chip according to a compaction hierarchy, with the compacted trace data bytes stored into a trace array of the emulation chip.

6 Claims, 6 Drawing Sheets

(56) References Cited

U.S. PATENT DOCUMENTS

| | | | |
|---|---|---|---|
| 8,532,975 B2* | 9/2013 | Poplack | G06F 17/5022 |
| | | | 703/23 |
| 8,943,369 B2 | 1/2015 | Bansal | |
| 9,015,026 B2* | 4/2015 | Poplack | G06F 17/5022 |
| | | | 703/23 |
| 9,171,111 B1* | 10/2015 | Elmufdi | G06F 17/5027 |
| 9,292,640 B1* | 3/2016 | Elmufdi | G06F 17/5045 |
| 9,372,947 B1* | 6/2016 | Elmufdi | G06F 17/5027 |
| 2001/0034597 A1* | 10/2001 | Swoboda | G01R 31/31705 |
| | | | 703/26 |
| 2004/0103349 A1 | 5/2004 | Nardini | |
| 2009/0259457 A1 | 10/2009 | Quennesson | |
| 2010/0318344 A1* | 12/2010 | Poplack | G06F 17/5022 |
| | | | 703/23 |
| 2010/0318952 A1* | 12/2010 | Poplack | G06F 17/5022 |
| | | | 716/108 |
| 2012/0216080 A1 | 8/2012 | Bansal | |
| 2012/0253780 A1 | 10/2012 | Talla | |

* cited by examiner

METHOD AND SYSTEM FOR TRACE COMPACTION DURING EMULATION OF A CIRCUIT DESIGN

CROSS-REFERENCE TO RELATED APPLICATION

This application is a Divisional application and claims the benefit of U.S. patent application Ser. No. 14/500,899, filed Sep. 29, 2014, now issued as U.S. Pat. No. 9,372,947. U.S. patent application Ser. No. 14/500,899 is hereby incorporated herein by reference in its entirety.

FIELD

The present patent document relates generally to verifying the functionality of integrated circuit designs. In particular, the present patent document relates to a method for compacting trace data generated by emulation processors during emulation of a circuit design, and a hardware functional verification system that compacts trace data.

BACKGROUND

Typical functional verification systems, including hardware emulation systems and simulation acceleration systems, utilize interconnected programmable logic chips or interconnected processor chips. Examples of systems using programmable logic devices are disclosed in, for example, U.S. Pat. No. 6,009,256 entitled "Simulation/Emulation System and Method," U.S. Pat. No. 5,109,353 entitled "Apparatus for emulation of electronic hardware system," U.S. Pat. No. 5,036,473 entitled "Method of using electronically reconfigurable logic circuits," U.S. Pat. No. 5,475,830 entitled "Structure and method for providing a reconfigurable emulation circuit without hold time violations," and U.S. Pat. No. 5,960,191 entitled "Emulation system with time-multiplexed interconnect." U.S. Pat. Nos. 6,009,256, 5,109,353, 5,036,473, 5,475,830, and 5,960,191 are incorporated herein by reference. Examples of hardware logic emulation systems using processor chips are disclosed in, for example, U.S. Pat. No. 6,618,698 "Clustered processors in an emulation engine," U.S. Pat. No. 5,551,013 entitled "Multiprocessor for hardware emulation," U.S. Pat. No. 6,035,117 entitled "Tightly coupled emulation processors," and U.S. Pat. No. 6,051,030 entitled "Emulation module having planar array organization." U.S. Pat. Nos. 6,618,698, 5,551,013, 6,035,117, and 6,051,030 which are incorporated herein by reference.

Visualization, also referred to as tracing, is an important feature in processor-based emulation systems. Visualization is the ability for a user to capture and observe the states of elements in the design being emulated. The ability to observe the state of every node (i.e., processor output) of a particular integrated circuit design, is an important feature for functional verification systems. Visualization is needed over certain periods of time, i.e., over a number of clock cycles. By capturing the internal states of the nodes during emulation, the user can observe the activity in the design being emulated and therefore be able to debug the design. Without the ability to observe the internal states of the nodes during emulation, it is more difficult for a user to understand the cause of any bugs in the design.

One mechanism to capture trace data has been through the use of a data capture card (DCC). A dedicated trace capture interface is provided to collect and capture trace signals into a DRAM of the data capture card for later upload to the workstation, where it can be reconstructed and displayed for the user. This mechanism provides the ability to capture the states of signals in the design while minimizing the use of regular emulation resources (virtual logic) for trace collection. This interface also provides for the ability to perform conditional acquisition of signal data by holding it in a trace array until it receives a control or trigger signal indicating whether the collected data should be transferred to the DCC, or discarded. The trace array may be a dual-ported SRAM, with a width large enough to accommodate the maximum possible capture bandwidth provided by any trace capture logic to be used.

According to some mechanisms, one of the outputs of an emulation processors data memory may have a dedicated connection to trace capture circuitry. The dedicated trace output would then be routed to the trace array and captured. Since typically up to around one-fourth of the emulation processor outputs represented the outputs of emulated flops, around one-fourth of all emulation processor evaluations would need to be captured in each emulation step to perform tracing. Because of the use of a dedicated output, the scheduler routed signals to the dedicated trace outputs of available emulation processors, which could extend the number of emulation steps needed to capture all the desired signals. There is also potentially wasted trace capacity since a single capture control signal was used to control all of the signals at once, preventing targeted recording of a subset of trace outputs. Thus, for at least these reasons there is a need for an improved method and apparatus for capturing trace data generated in a processor-based emulation system.

SUMMARY

A method for compacting trace data generated by emulation processors during emulation of a circuit design, and a hardware functional verification system that compacts trace data.

One embodiment is a method of compacting trace data in emulation chip. The method comprises generating a plurality of data bits from a plurality of emulation processors in the emulation chip, wherein the data bits comprise a plurality of trace data bits and a plurality of non-trace data bits; associating a plurality of enable bits with the plurality of data bits; selecting the plurality of trace data bits from the plurality of data bits according to the plurality of enable bits; and accumulating the selected plurality of trace data bits into a plurality of state elements.

Another embodiment comprises a computer-readable non-transitory storage medium having stored thereon a plurality of instructions. The plurality of instructions when executed by a computer, cause the computer to perform generating a plurality of data bits from a plurality of emulation processors in an emulation chip, wherein the data bits comprise a plurality of trace data bits and a plurality of non-trace data bits; associating a plurality of enable bits with the plurality of data bits; selecting the plurality of trace data bits from the plurality of data bits according to the plurality of enable bits; and accumulating the selected plurality of trace data bits into a plurality of state elements.

Another embodiment comprises generating a plurality of data bits from a plurality of emulation processors in the emulation chip, wherein the data bits comprise a plurality of trace data bits and a plurality of non-trace data bits; associating a plurality of enable bits with the plurality of data bits; selecting the plurality of trace data bits from the plurality of data bits according to the plurality of enable bits; and accumulating the selected plurality of trace data bits into a plurality of state elements.

In another embodiment the plurality of state elements comprise a first set of state elements that has a capacity to temporarily store accumulated trace data bits of a first trace data byte, and a second set of state elements that has a capacity to temporarily store accumulated trace data bits in addition to the first trace data byte.

Another embodiment comprises outputting the first trace data byte once the first set of state elements has been filled with trace data bits.

Another embodiment comprises accumulating trace data bits in the second set of state elements if the first set of state elements is filled with trace data bits prior to outputting the first trace data byte.

Another embodiment comprises transferring the output first trace data byte from the first set of state elements to a random access memory.

Another embodiment comprises storing, along with the first trace data byte, one or more bits identifying a source emulation processor cluster for the first trace data byte.

Another embodiment comprises accumulating trace data bits in the second set of state elements if the first set of state elements currently stores the byte of trace data prior to outputting the byte of trace data.

Another embodiment comprises, for each of the selected plurality of trace data bits, accumulating the enable bit associated with the trace data bit into a corresponding state element of the plurality of state elements.

Another embodiment comprises outputting from the plurality of state elements a trace data byte comprising eight trace data bits and one enable bit.

Another embodiment is a hardware functional verification system that comprises a plurality of interconnected emulation chips to be programmed with a circuit design, an emulation chip comprising: a plurality of emulation processors that generate a plurality of data bits during an emulation step of the emulation chip, wherein one or more data bits of the plurality of data bits are indicated as trace data bits by one or more enable bits; a trace data register to temporarily store trace data bits in a plurality of bit positions; and a trace compaction circuit connected to the output of the plurality of emulation processors and the trace data register to compact the one or more trace data bits received from the plurality of emulation processors into adjacent bit positions of the trace data register according to the one or more enable bits.

According to another embodiment the trace data register outputs a first trace data byte comprising compacted trace data bits.

According to another embodiment the first trace data register further comprises a plurality of registers that temporarily store a plurality of enable bits associated with the trace data byte.

In another embodiment the emulation chip further comprises a first emulation processor cluster comprising the plurality of emulation processors, the trace data register, and the trace compaction circuit; a second emulation processor cluster comprising a second plurality of emulation processors, a second trace data register, and a second trace compaction circuit; a third trace data register to temporarily store a plurality of trace data bytes; and a third trace compaction circuit that is connected to the trace data register to receive the first trace data byte output from the trace data register, connected to the second trace data register to receive a second trace data byte output from the second trace data register, and the third trace data register to compact the first trace data byte and the second trace data byte into adjacent bit positions of the third trace data register.

In another embodiment the third trace data register outputs a third trace data byte comprising the first trace data byte and the second trace data byte, and wherein the emulation chip further comprises a trace array of memories to store the third trace data byte.

In another embodiment the emulation chip further comprises an error correction code generation circuit to generate an error correction code for trace data bytes to be stored in the trace array.

In another embodiment the trace compaction circuit comprises a plurality of multiplexers, wherein a multiplexer of the plurality of multiplexers has a plurality of data inputs configured to receive the plurality of data bits, and wherein the multiplexer has a plurality of selection inputs configured to receive the one or more enable bits to select a data input of the plurality of data inputs.

The above and other preferred features described herein, including various novel details of implementation and combination of elements, will now be more particularly described with reference to the accompanying drawings and pointed out in the claims. It will be understood that the particular methods and apparatuses are shown by way of illustration only and not as limitations of the claims. As will be understood by those skilled in the art, the principles and features of the teachings herein may be employed in various and numerous embodiments without departing from the scope of the claims.

BRIEF DESCRIPTION OF THE DRAWINGS

The accompanying drawings, which are included as part of the present specification, illustrate the presently preferred embodiments and together with the general description given above and the detailed description of the preferred embodiments given below serve to explain and teach the principles described herein.

Figure 1:
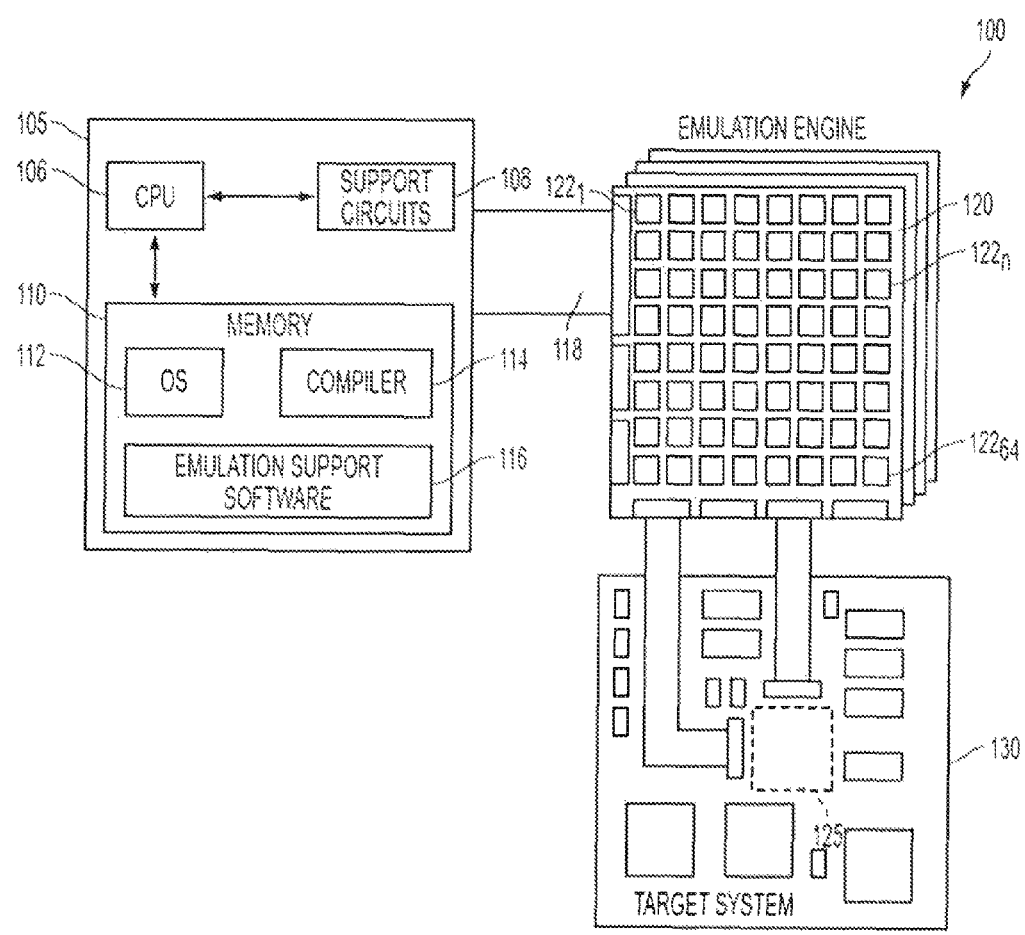
FIG. 1 is an illustration of an overview of a processor-based emulator system (processor-based hardware functional verification system).

The figures are not necessarily drawn to scale and the elements of similar structures or functions are generally represented by like reference numerals for illustrative purposes throughout the figures. The figures are only intended to facilitate the description of the various embodiments described herein; the figures do not describe every aspect of the teachings disclosed herein and do not limit the scope of the claims.

DETAILED DESCRIPTION

A method for compacting trace data generated by emulation processors during emulation of a circuit design, and a hardware functional verification system that compacts trace data. Each of the features and teachings disclosed herein can be utilized separately or in conjunction with other features and teachings. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

In the following description, for purposes of explanation only, specific nomenclature is set forth to provide a thorough understanding of the various embodiments described herein. However, it will be apparent to one skilled in the art that these specific details are not required to practice the concepts described herein.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. A register can be implemented as a D flip flop or other element to temporarily hold the state of a circuit element or node.

Also disclosed is an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), erasable programmable read-only memories (EPROMs), electrically erasable programmable read-only memories (EEPROMs), magnetic or optical cards, or any type of media suitable for storing electronic instructions, and each coupled to a computer system bus.

The algorithms presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the present teachings.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

FIG. 1 illustrate an overview of a hardware functional verification system specifically a processor-based emulation system 100, according to an embodiment. The system comprises a host or computer workstation 105, an emulation engine including emulation board 120, and a target system 130. Here a processor-based emulation engine is described, though other emulation engines, such as those utilizing arrays of programmable logic devices (such as FPGAs) may also be used, for example properly-configured versions of the systems discussed above.

The host workstation 105 provides emulation support facilities to the emulation engine 100 and emulation board 120. The host workstation 105, for example a personal computer, comprises at least one central processing unit (CPU) 106, support circuits 108, and a memory 110. The CPU 106 may comprise one or more conventionally available microprocessors and/or microcontrollers. The support circuits 108 are well known circuits that are used to support the operation of the CPU 106. These supporting circuits comprise power supplies, clocks, input/output interface circuitry, cache, and other similar circuits.

Memory 110, sometimes referred to as main memory, may comprise random access memory, read only memory, disk memory, flash memory, optical storage, and/or various combinations of these types of memory. Memory 110 may in part be used as cache memory or buffer memory. Memory 110 stores various forms of software and files for the emulation system, such as an operating system (OS) 112, a compiler 114, and emulation support software 116.

The compiler 114 converts a hardware design, such as hardware described in VHDL or Verilog, to a sequence of instructions that can be evaluated by the emulation board 120.

The host workstation 105 allows a user to interface with the emulation engine 100 via communications channel 118, including emulation board 120, and control the emulation process and collect emulation results for analysis. Under control of the host workstation 105, programming information and data is loaded to the emulation engine 100. The emulation board 120 has on it a number of individual emulation chips, for example the 64 emulation chips $122_1$ to 122₆₄ (collectively 122) shown in FIG. 1, in addition to miscellaneous support circuitry.

In response to programming received from the emulation support software 116, emulation engine 100 emulates a portion 125 of the target system 130. Portion 125 of the target system 130 may be an integrated circuit, a memory, a processor, or any other object or device that may be emulated in a programming language. Exemplary emulation programming languages include Verilog and VHDL.

Figure 2:
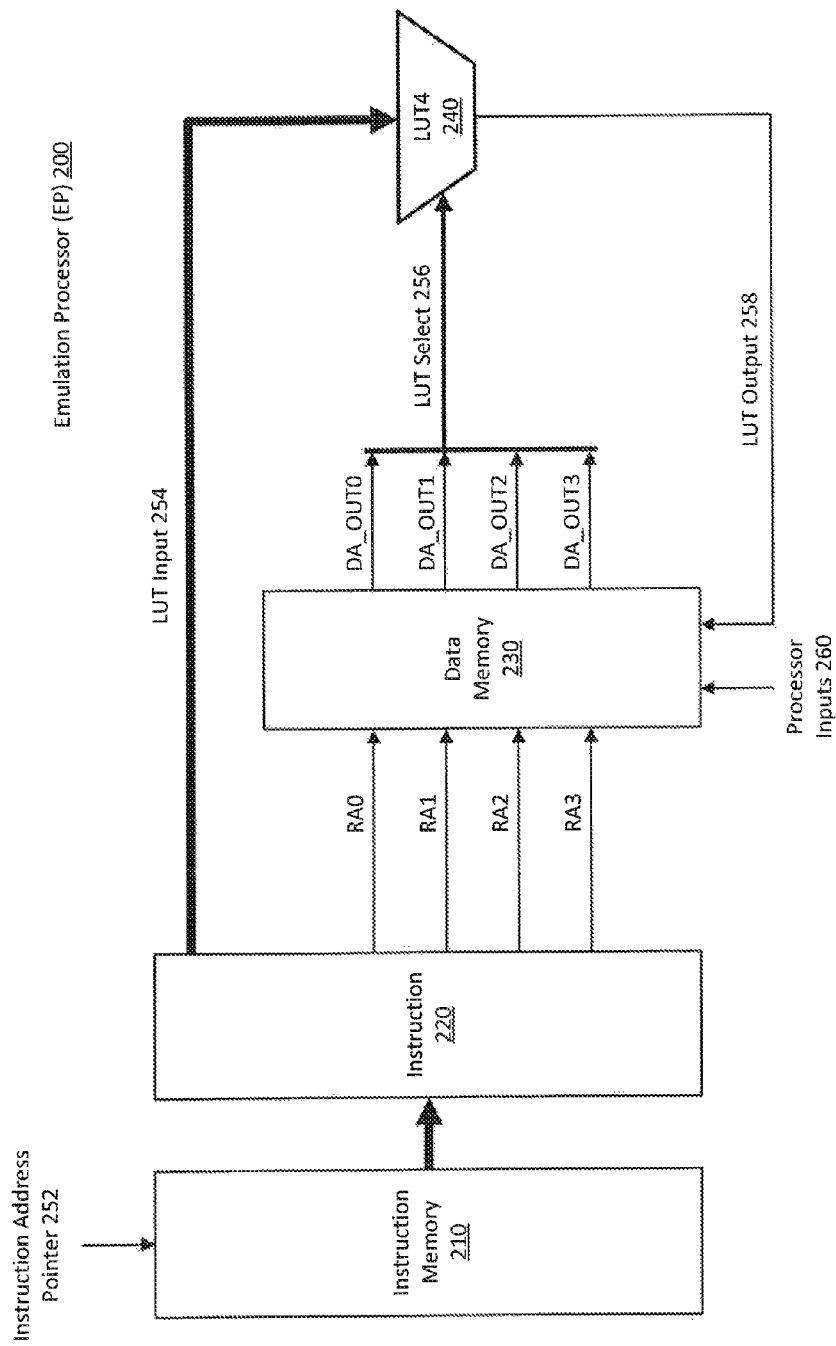
FIG. 2 is an illustration of an emulation processor.

FIG. 2 illustrates a single emulation processor 200 within an emulation chip 122, according to an embodiment. An instruction memory 210 is read sequentially and provides instructions 220 that are used to read bits out of a data memory 230. LUT select 256 bits are read from the data memory 230 and fed to a lookup table (LUT) 240 that is controlled by the instruction. Here, the LUT 240 is a four-input LUT, i.e. a LUT4. The result of the LUT function, LUT output 258 is then stored back into the data memory 230. Data memory 230 contains the results of previous LUT evaluations. The data memory 230 also stores inputs 260 that come from outside the processor, i.e. from other processors. As a result, the LUT 240 not only has access to previous results in data memory 230, but also values from outside the processor 260.

The instruction memory 210 has a depth that reflects the number of instruction words that may be stored therein. The time to execute a single instruction word by the processor is one step or emulation step. An emulation cycle is usually one pass through the instruction memory until the program depth is reached, and the number of steps in the cycle is equal to the program depth. Usually the program depth is the depth of the instruction memory, though the cycle may also be shorter.

The tracing mechanism described here reduces the reliance on a dedicated number of ports in the emulation processor that are reserved to capture trace data. According to a disclosed embodiment, a primary trace source is the output of the emulation processor—LUT output 258—rather than one of the DA_OUT0, DA_OUT1, DA_OUT2 or DA_OUT3 (one of the LUT Select 256 signals). Capturing trace data at LUT Output 258 instead saves read address port (RA0, RA1, RA2, RA3) resources, which enhances capacity and performance of the emulation processor. The trace compaction circuitry/mechanism further described herein enables the use of LUT Output 258 for tracing despite the fact that not all signals of LUT Output 258 are suitable to be written directly to the trace array. The emulation processor itself indicates whether or not to capture the value that it generates. On a given step, the executed instruction found in instruction memory 210 can indicate whether to capture the emulation processor output of that instruction for tracing purposes. Where so instructed, the captured output bit is sent to the tracing mechanism.

The final target of the tracing mechanism is the trace memory, which according to an embodiment is a DDR3 or DDR4 DRAM memory external to the actual emulation chip, and connected to the emulation chip through a plurality of external pins used to connect with and access the DRAM. According to other embodiments, this DRAM may be other types of double data rate (DDR) memory, or any other type of suitable memory. Here, the trace memory is external to the emulation chip, but it may also be formed on the same substrate as the emulation chip, or part of a multi-chip module with the emulation chip.

Current memory technology is such that if the trace memory were to capture just one of the bits generating per emulation processor in each emulation step, the generated bits would exceed the bandwidth of the trace memory. Thus, the number of signals captured should be only a fraction of the bits produced during a given emulation step.

Two different types of capture cycles are defined and used to more efficiently capture trace data according to an embodiment. The first of the capture cycles captures a larger percentage of the data output by the emulation processors: about 40% of the output signals according to one embodiment (snapshot cycles). This type of cycle produces a snapshot of the emulation processors effectively to provide a substantially complete view of the emulated device under test (DUT) at a particular time in the emulation. For a number of cycles subsequent to the first cycle, a second cycle that captures a much smaller amount of trace data is used (primary JO cycles). For example, these second cycles may only capture 1% to 3% of all emulation processor outputs. These second cycles provide enough information—when analyzed together with the first cycle—to reconstruct all of the emulation cycles while using less trace memory bandwidth than would be used if only first cycles were to be used.

According to the compaction scheme of an embodiment, the processor outputs are captured using logic distributed into the various levels of logic of the emulation chip. The five logic levels of the emulation chip pertinent here are the individual emulation processor level (EP), the eight processor level (P8), the sixty-four processor level (P64), the five hundred twelve processor level (P512), and the emulation chip level. The compaction logic may act independently of each other and is arranged according to a tree hierarchy among the logic levels. Each subsequent level receives a group of signal pairs: a trace data bus and a valid (or enable) signal for the trace data.

Figure 3:
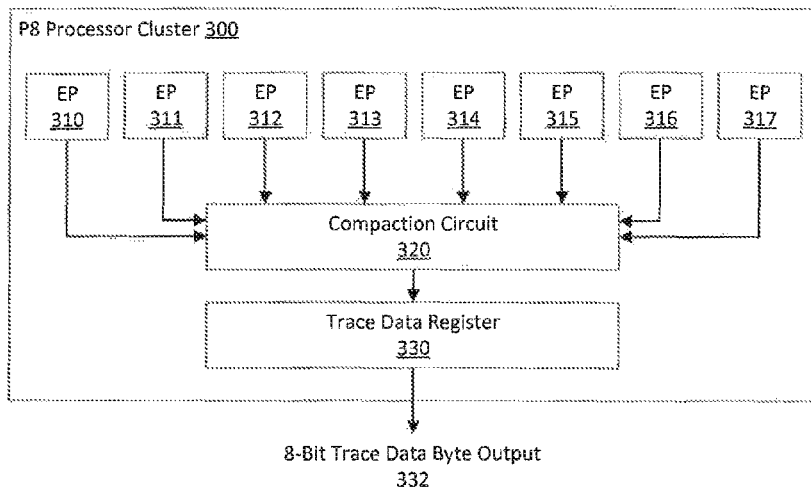
FIG. 3 is an illustration of compaction circuits in a P8 processor cluster.

First, at the emulation processor level, there is a stream of one data bit and one enable bit generated each emulation step from each emulation processor (EP). FIG. 3 illustrates certain blocks of a single P8 processor cluster 300. Each emulation processor 310 through 317 generates an output bit each emulation step. Each bit output has associated with it an enable bit, where the enable bit is used to indicate whether the output data bit is valid as trace data or not.

Second, for the compaction logic at the P8 level as illustrated in FIG. 3, the data bits from the eight emulation processors are compacted by the compaction circuit 320 and stored in a trace data register 330. The eight emulation processors 310 through 317 are arranged in a cluster, P8 processor cluster 300. From each emulation processor EP 310 through EP 317, there are generated every emulation step either a single valid data bit, or no valid data. Any data bits that have an active enable (valid trace data bits) will be packed (right-justified) and stored until eight valid data bits have been accumulated in the trace data register 330, at which point the eight bits of compacted data will be passed to the next stage of the compaction tree as an eight-bit byte at output 332. The compaction logic selects the outputs from the first level of compaction logic such that a byte of data (or a byte of invalid data) is output every emulation step along with its associated enable bit. If there are fewer than eight valid enable bits, then the bits with active enable bits will be packed—right-justified—until further bits with active enables are available to combine into a single eight-bit byte. When the eight bits of a byte are filled with valid data bits, the byte is passed to the next level of compaction in the compaction tree.

Figure 4:
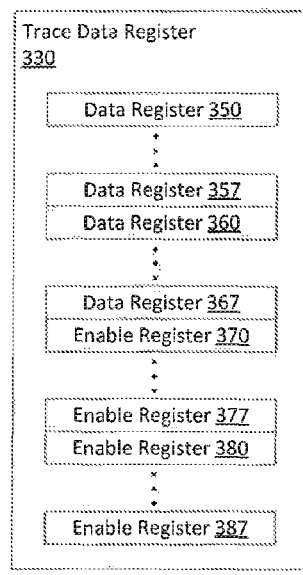
FIG. 4 is an illustration of a trace data registers in a P8 processor cluster.

Here, there are eight emulation processors EP 310 through 317 and, as illustrated in FIG. 4, trace data register 330 is sized appropriately to temporarily store an eight-bit trace data byte before it is output from the P8 processor cluster 300. Trace data register 330 contains eight data registers 350 through 357 that temporarily store eight trace data bits. Only two of trace data registers 350 through 357 are illustrated in FIG. 4; trace data registers 351 through 356 are not shown. Trace data registers 361 through 366, as well as enable registers 371 through 376 and 381 through 386, are also not shown. The registers may also any other state element that can store a single bit of data for a time before releasing it. Trace data register 330 also has eight enable registers 370 through 377 that temporarily store enable bits. Each time a trace data bit is stored in a register, a corresponding enable bit is stored in an enable register. This way, a simple circuit can be set up to output the contents of the data registers 350 through 357 as a trace data byte when the trace data registers are detected as full. For example, an eight-input AND may be connected to the outputs of the enable registers 370 through 377 to detect when each have a bit value of "1", where the AND output triggers the release of the contents of the trace data registers as an eight-bit trace data byte.

Trace data register 330 contains a second set of eight data registers 360 through 367, including their associated enable registers 380 through 387. As described further below, these additional registers are used to temporarily store any overflow bits from the emulation processors that need to be stored while waiting for the trace data byte to be output from the P8 processor cluster 300. For example, if six trace data bits are output from the emulation processors during a particular emulation step, but there are only three bit positions available in data registers 350 through 357, then the other three trace data bits may be stored in data registers 360 through 367 until the eight bit trace data byte is unloaded from data registers 350 through 357.

In another example, a first emulation step six of the eight bits have valid enable bits, a second emulation step has one bit with a valid enable bit, and a third emulation step has four more bits with valid enable bits. The six bits of the first emulation step, one from the second emulation step, and one of the four bits (with three of the four bits remaining) from the third emulation step will be accumulated into an eight-bit byte in a register that is output after the third emulation step finishes accumulating valid data into the register.

Emulation steps may be scheduled into groups of emulation cycles called major emulation cycles. Because each byte is passed once the eight bits of the register are filled, in order to avoid leaving behind data bits generated in the last emulation cycle, dummy bits may be used according to another embodiment. The scheduler can schedule a number of dummy capture bits marked as valid in the last step of the cycle to fill in the remaining bits.

Eight emulation processors EP 310 through EP 317 are illustrated in FIG. 3. A greater or fewer number of emulation processors may be organized into an emulation processor cluster according to other embodiments. According to this embodiment, there are eight emulation processors per cluster, and eight is convenient to form eight bit trace data bytes, but other powers of two (four, sixteen, and so on) can similarly be implemented and the trace data compacted using analogous compaction circuitry and appropriately-sized trace data registers. Likewise less conventional numbers may also be used, such as six emulation processors, and still benefit from the disclosed compaction techniques.

In a P8 processor cluster 300, trace masking may be used to tag which emulation processors' outputs should be captured during a particular emulation cycle. If the trace data were always captured at the various read address ports (RA0_DA_DOUT, RA1_DA_DOUT, RA2_DA_DOUT, RA3_DA_DOUT) the scheduler would be able to select where the data is to be traced from and balance the trace data and ensure that an emulation chip would not exceed the maximum tracing capability. When trace data is instead captured at LUT Output 258 (the outputs of the emulation processors, also called DSI) instead of at the various read address ports for an emulation processor, the schedule may be no longer able to control from where the trace data is to be captured because it is always captured at the output of the emulation processor. An embodiment provides a balancing mechanism whereby the capture of trace data may be from either LUT Output 258 or the read address ports for half of the emulation processors in a P8 processor cluster. These processor clusters are connected so that trace data may be driven either from LUT Output 258 or their RA3_DA_DOUT signal according to a trace mask value. This gives the scheduler greater flexibility to balance the capture of trace data.

The three bits controlling the trace masking, TRACE[2:0], may be stored in an instruction memory for the P8 processor cluster. In the P8 processor clusters, for trace purposes there are two types of emulation processors, those that have two trace bits and those that have three. For processors that do not have a TRACE[2] value, that value is automatically set to "0". The TRACE[1:0] value is used to determine whether to capture data from the emulation processor to the trace compaction logic in the current step or not, according to the value of a TRACEMASK signal at a given time. The TRACE[2] signal decides whether to send the previous output of a flop or the data in the current step (RA3_DA_DOUT).

The TRACEMASK signal is provided by broadcast from the sequencer to all the P8 processor clusters. The value of the TRACEMASK signal indicates whether: (1) no data should be captured to the trace compaction logic; (2) the system is currently on a primary IO cycle; (3) the system is currently on a snapshot cycle; or (4) the emulation processors that should capture data to the trace compaction logic on both primary IO and snapshot cycles should capture data. Primary IO cycles and snapshot cycles are discussed above. As an example, if an emulation processor has a value for TRACE[2:0] indicating that it should capture its RA3_DA_DOUT bit on a primary IO cycle, then when the TRACEMASK signal value indicates that the system is on a primary IO cycle, that emulation processor will capture data to the trace compaction circuitry. If the value of TRACEMASK signal indicates that the system is on a snapshot cycle, that particular emulation processor will not capture data.

Figure 5:
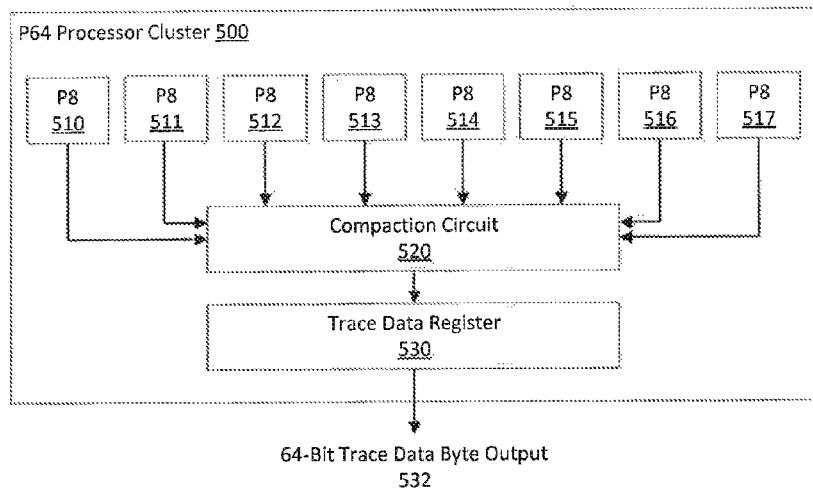
FIG. 5 is an illustration of compaction circuits in a P64 processor cluster.

FIG. 5 illustrates a P64 processor cluster and corresponding compaction logic at the P64 level. Eight processor clusters P8 510 through P8 517 are like copies of P8 processor clusters. The eight-bit trace data byte outputs 332 from each of the P8 processor clusters are fed into compaction circuit 520 containing compaction logic. Because valid compacted trace data bytes will not be continuously output from each P8 processor cluster, there will be gaps between the valid trace data bytes.

For the compaction logic at the P64 level, gaps between the valid data bytes output from the compaction logic at the P8 level are eliminated, generating sixty-four bit words of valid trace data for storage in the trace memory. The compaction logic at the P64 processor cluster 500 level takes the byte outputs from the P8 level compaction logic for eight sets of P8 processor clusters P8 500. Table 1 illustrates the data bytes (in hexadecimal) output from the compaction logic at the P8 level for each of eight sets of P8 processor clusters per emulation step, which is eight trace data bytes per emulation step. The enable bits are not illustrated, but accompany the trace data bytes. Here, dashes "--" indicate data that do not have a valid enable bit associated with them, i.e. they are not enabled.

TABLE 1

| Step\P8 | 7  | 6  | 5  | 4  | 3  | 2  | 1  | 0  |
|---------|----|----|----|----|----|----|----|----|
| 1       | —  | —  | —  | —  | 02 | —  | 01 | 00 |
| 2       | —  | 07 | 06 | 05 | —  | 04 | —  | 03 |
| 3       | 0E | —  | 0D | 0C | 0B | 0A | 09 | 08 |
| 4       | 11 | 10 | 0F | —  | —  | —  | —  | —  |
| 5       | 18 | 17 | 16 | —  | 15 | 14 | 13 | 12 |
| 6       | —  | 1C | —  | 1B | —  | 1A | —  | 19 |
| 7       | —  | —  | —  | 20 | 1F | 1E | 1D | —  |
| 8       | 27 | 26 | 25 | 24 | 23 | 22 | 21 | —  |

At emulation step 1, the byte output from the compaction logic of processor cluster "0" is "00", the byte output from the compaction logic of processor cluster "1" is "01", and the byte output from the compaction logic of processor cluster "2" is indicated as not enabled ("--"), and so on up to processor cluster "7". At emulation step 2, the byte output from the compaction logic of processor cluster "0" is "03", the byte output from the compaction logic of processor cluster "1" is indicated as not enabled ("--"), the byte output from the compaction logic of processor cluster "2" is "04", and so on up to processor cluster "7".

As the output data bytes and enable bits are accumulated into the trace data register 530, the bytes are right justified in the hardware implementation of an embodiment. Table 2 illustrates the data contents of two sixty-four bit registers at each emulation step based on the valid data bytes accumulated from the outputs of the eight P8 processor clusters. The justification may be accomplished using an eight-to-one mux for each data bit. The select logic for the mux uses eight, three-bit functions of eight, i.e. the eight enable bits specify which byte to select each of the eight times. After a first emulation step, the byte output from each of the P8 processor clusters P8 510 through P8 517 (see emulation step 1 in Table 1) having an enable bit are accumulated into the data register (illustrated at step 1 in Table 2). Also accumulated are the enable bits associated with each of the data bytes, which enable bits are not show in Tables 1 or 2, but are temporarily stored in corresponding bit positions in the trace data register 530. Then, the byte output from a second emulation step (see emulation step 1 in Table 1) is accumulated into the data register, filling out the first sixty-four bits of the data register (illustrated at step 2 in Table 2). Because the data contents of the first data register is now filled—and more precisely, the eight enable bits have filled the enable bit register—the sixty-four bits of data are forwarded on to the next stage of compaction logic. Table 3 illustrates the sixty-four bit words output as a result of its corresponding emulation step.

TABLE 2

| Steps | Data Register Contents |        |
|-------|------------------------|--------|
| 1     | ----------------       | ----------020100 |
| 2     | ----------------       | 0706050403020100 |
| 3     | ----------------       | --0E0D0C0B0A0908 |
| 4     | -------------1011      | 0F0E0D0C0B0A0908 |
| 5     | --------------18       | 1716151413121110 |
| 6     | ----------------       | ------1C1B1A1918 |
| 7     | --------------20       | 1F1E1D1C1B1A1918 |
| 8     | ----------------       | 2726252423222120 |

As shown in Table 1, the valid data output from the P8 process cluster at emulation step 4 comprises three bytes of valid data: "0F1011." As shown in Table 2 at emulation step 3, the first fifty-six bits of the sixty-four bit data register are already filled with emulation data. As a result, after emulation step 4, the first byte is accumulated into the last eight bit positions of the sixty-four bit data register, while the second and third bytes are accumulated into the first sixteen spillover data register bit positions. The first sixteen bits of the enable register become filled and the first eight bytes (sixty-four bits) of the data register are shifted out to the next compaction level as one sixty-four bit trace data byte output 532, as illustrated in emulation step 4 of Table 3.

TABLE 3

| Steps | P64 |
|-------|-----|
| 1     | ---------------- |
| 2     | 0706050403020100 |
| 3     | ---------------- |
| 4     | 0F0E0D0C0B0A0908 |
| 5     | 1716151413121110 |
| 6     | ---------------- |
| 7     | 1F1E1D1C1B1A1918 |
| 8     | 2726252423222120 |

Figure 6:
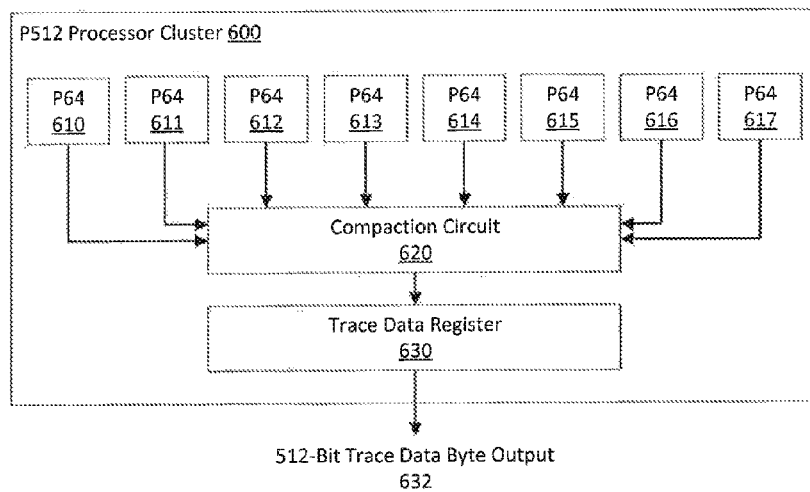
FIG. 6 is an illustration of compaction circuits in a P512 processor cluster.

As illustrated in FIG. 6, for compaction at the P512 level, groups of eight bytes (sixty-four bits each) from a group of eight P64 processor clusters P64 610 through P64 617 are accumulated by logic of the compaction circuit 620 into trace data register 630 until a group of 512 bits is ready to forward on to the trace array. The mechanism used is analogous to that for compaction at the P64 level, where the first portion of the trace data register 630 is now sized at 512 bits wide, the second portion of the data register is also 512 bits wide, the first portion of the enable register is eight bits wide, and the second portion of the enable register is another eight bits wide. Similar to the mechanisms described above with respect to FIGS. 4 and 5 a 512-bit trace data byte 632 is output from the P512 processor cluster 600 once at least 512 bit positions of trace data register 630 are filled. The trace data bytes are next compacted into the trace array.

Figure 7:
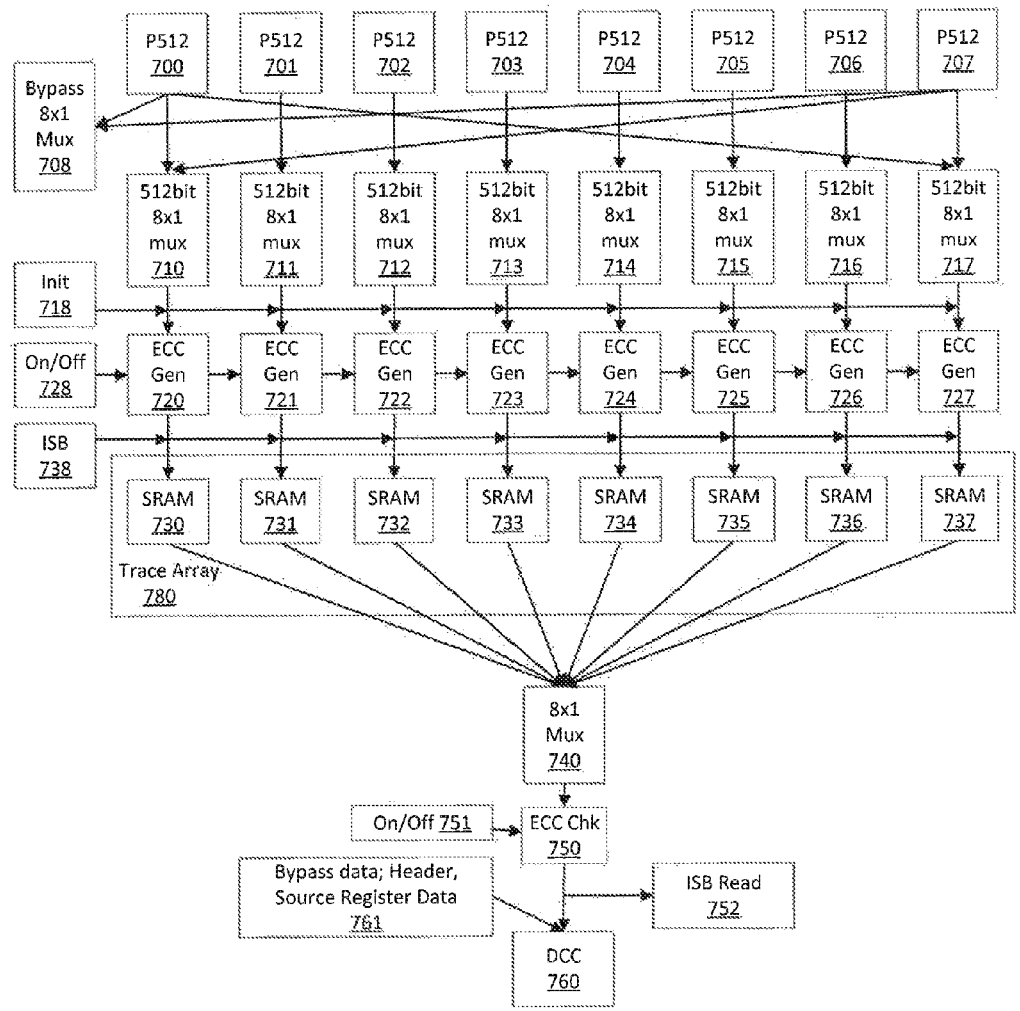
FIG. 7 is an illustration of compaction circuits for trace data at the level of an emulation chip.

FIG. 7 illustrates the compaction of trace data from the P512 processor clusters 700 through 707 according to an embodiment. Once 512 bits are accumulated in the data register from each P512 processor cluster, the data will then be written into memory of the trace array 780, comprising SRAM 730 through SRAM 737. Since all (up to eight) P512 processor clusters 700 through 707 could have blocks of data ready during the same emulation step, the trace array is implemented 4k bits wide. For example, this physically could be eight 2 k deep by 512 bit wide SRAM's, as illustrated in FIG. 7 by SRAM 730 through SRAM 737. According other embodiments, memories of various depths and widths can also be used, and have alternative arrangements. For example, two 2 k wide by 1 k deep SRAM memories could be used for trace array 780. This width allows the data to be written in a single step (along with ECC bits generated by ECC generators 720 through 727, respectively, as well as tag bits indicating which of P512 700 through 707 provided each block). Each SRAM 730 through 737 is preceded by a 512 bit wide 8×1 mux 710 through 717, respectively, to steer data appropriately from a given P512 700 through 707 to the memory of the trace array 780. In any given step, anywhere from zero to eight 512-bit blocks of data may be written from the compaction logic into the trace array 780.

In an embodiment where the trace array is implemented using the above-discussed eight 512 bit wide SRAMs, the address pointers of the trace array 780 to the 512 bit blocks of data may be eleven bits to address the 2 k depth of the memories, and 3 more bits to address the eight 512 bit blocks across the 4 k width, for a total of fourteen bits (16 k 512-bit blocks). As in the other stages of compaction, the 512 bit blocks will be written into the trace array 780 starting where the last write left off. Put another way, the data will be written to address n in SRAM 730 through 737 respectively, and then the address will be incremented to n+1 and data written to that address in each of SRAM 730 through 737. For example, four blocks are to be written to address n, starting in each SRAM 730 through 733. In the next step eight blocks need to be written, then SRAM 734 through 737 would store the data from P512 700 though 703 respectively in address n, and then the write address would be incremented and SRAM 730 through 733 would store the data from P512 704 though 707 in address n+1. Writes to each of SRAM 730 through 737 may all occur in the same step. When the data stored in the trace array 780 is transferred to the data capture card (DCC) 760, the data from P512s 700 through 707 will be stored sequentially, where the described wrapping that occurred internal to the trace array 780 is not visible.

According to another embodiment, fewer or greater numbers of P512 processor clusters may be used. For example, if six P512 processor clusters are implemented, then P512s 706 and 707 do not exist, and the associated muxes 716 and 717 may be eliminated, and SRAMs 736 and 737 need not be in the trace array. The error correction control (ECC) generation circuitry 726 and 727, as well as other associated circuitry, may likewise be omitted. In addition, fewer P512s may reduce the number of input ports needed for the emulation chip.

In another embodiment, the SRAMs of the trace array 780 (any one of SRAMs 730 through 737) may each be assembled from a plurality of narrower SRAMs having the same depth, and leaving room for ECC bits or bits identifying the source P512 for the stored data. For example if SRAM 730 needs to be 512 bits wide and 2 k deep, then SRAM 730 may comprise fifteen individual SRAM blocks, each 36 bits wide and 2 k bits deep. Thus, there will be 540 bits of total memory width. Thereby, 512 bits are used for data storage, while 28 bits are left to store ECC bits and a field identifying the source P512 for a particular block of data stored in SRAM 730.

Figure 8:
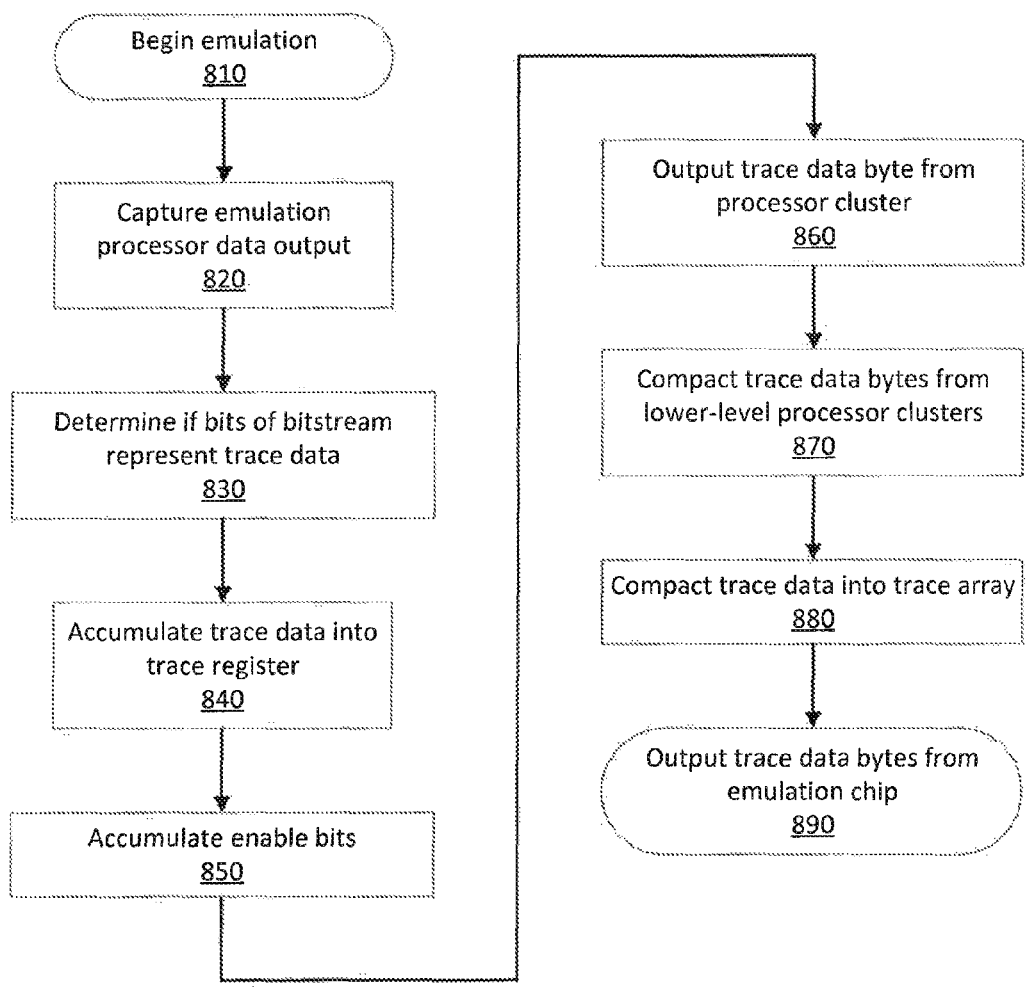
FIG. 8 illustrates a flow to compact trace data generated by a plurality of emulation processors during emulation of a circuit design.

FIG. 8 illustrates an overall flow for compacting trace data according to an embodiment. Various details of the hardware and more specific implementation may be gleaned from descriptions found throughout this disclosure. After one or more emulation chips of the hardware functional verification system have been configured to emulate a circuit design, emulation may begin at step 810. The flow may be performed once or repeated throughout the emulation process, continually or as a loop, to capture trace data generated during emulation. The flow may commence at the beginning of all emulation or an individual emulation cycle (one pass through the instruction memory of the emulation processor). As the emulation processors evaluate instructions, data bits are generated by the emulation processors and captured by compaction logic of the processor cluster at step 820. At step 830 the compaction logic determines if the generated data bits are valid as trace data bits. According to one embodiment, the instruction evaluated in the emulation processor may contain a field for an enable bit, indicating whether the processor output should be captured as trace data. However, the enable bit may be generated by other mechanisms as well. At step 840 the trace data bits are accumulated into a register or group of other state elements configured to temporarily store plurality of trace data bits. The enable bits corresponding to the trace data bits are likewise accumulated into a corresponding bit position of the register or other group of state elements at step 850. Steps 840 and 850 may be performed in parallel or at slightly different times. Once a sufficient number of trace data bits have been accumulated to comprise a byte of trace data (for example, eights bits of trace data for an eight-bit trace data byte or thirty-two bits of trace data for an thirty-two-bit trace data byte), the trace data byte can be output from the emulation processor cluster containing the set of emulation processors. The trace data register is also sized to accommodate overflow, that is, trace data bits in excess of the trace data byte size that may be accumulated before the trace data byte is output, freeing up those bit positions in the register.

Compaction of trace data may be performed hierarchically, such that emulation processors are grouped in emulation processor clusters, which may be further grouped into larger groups (clusters) of emulation processor clusters, and so on. In such case, at step 870 the trace data bytes from emulation processor clusters at a lower level may be input to compaction logic at a higher level at step 870. Similar to the process for compacting trace data directly from the emulation processors, enable bits are associated with the trace data bytes from the lower level emulation processor clusters. The trace data bytes and enable bits are accumulated into trace data registers to form larger trace data bytes. For example eight-bit trace data bytes may be accumulated into sixty-four bit trace data bytes in this higher level compaction logic. Now, the register or other group of state elements is sized larger to accommodate the increased trace data byte size. Once enough lower level trace data bytes are accumulated into the higher level trace data byte register, the higher level trace data byte may be output. Once again the register may comprise overflow capacity to handle lower level trace data bytes accumulated in excess of the higher level trace data byte size. If there are further levels in the compaction hierarchy, the trace data byte compaction process of step 870 may be repeated at each step of the hierarchy.

At step 880 the trace data from the highest level processor clusters are compacted at the chip level into a trace array. This trace array can be a SRAM or other suitable memory device to prepare the trace data bytes to be sent off-chip. In an embodiment, an error correction code (ECC) may be generated for the trace data. In other embodiments, other additional data may be added to the trace data byte prior to being stored in the trace array. At step 890 the trace data bytes may be sent off-chip, i.e. output from the emulation chip.

In certain of the disclosed embodiments, trace data bytes are one of eight trace data bits, sixty-four trace data bits, or 512 trace data bits. According to other embodiment, a trace data byte may comprise fewer or greater number of trace data bits. Likewise, greater or fewer numbers of hierarchical levels of emulation processor clusters may be used. Also, according to other embodiments the compaction logic may accumulate trace data from more than one processor cluster. For example, according to another embodiment, two processor clusters of four emulation processors each may share compaction logic and a trace data register; the compaction logic need not be limited to within an individual emulation processor cluster. Likewise, a single emulation processor cluster may compact trace data for only a subset of all the emulation processors in the processor cluster. For example, one set of compaction logic in a sixty-four emulation processor cluster may compact trace data bits from only eight or sixteen of the emulation processors.

Although various embodiments have been described with respect to specific examples and subsystems, it will be apparent to those of ordinary skill in the art that the concepts disclosed herein are not limited to these specific examples or subsystems but extends to other embodiments as well. Included within the scope of these concepts are all of these other embodiments as specified in the claims that follow.

What is claimed is:

1. A hardware functional verification system, comprising:
    a plurality of interconnected emulation chips to be programmed with a circuit design, an emulation chip comprising:
        a plurality of emulation processors that generate a plurality of data bits during an emulation step of the emulation chip, wherein one or more data bits of the plurality of data bits are indicated as trace data bits by one or more enable bits;
        a trace data register to temporarily store trace data bits in a plurality of bit positions; and
        a trace compaction circuit connected to an output of the plurality of emulation processors and the trace data register to compact the one or more trace data bits received from the plurality of emulation processors into adjacent bit positions of the trace data register according to the one or more enable bits.

2. The hardware functional verification system of claim 1, wherein the trace data register outputs a first trace data byte comprising compacted trace data bits.

3. The hardware functional verification system of claim 2, wherein the trace data register further comprises a plurality of registers that temporarily store a plurality of enable bits associated with the trace data byte.

4. The hardware functional verification system of claim 1, wherein the emulation chip further comprises:
    a first emulation processor cluster comprising the plurality of emulation processors, the trace data register, and the trace compaction circuit;
    a second emulation processor cluster comprising a second plurality of emulation processors, a second trace data register, and a second trace compaction circuit;
    a third trace data register to temporarily store a plurality of trace data bytes; and
    a third trace compaction circuit that is connected to the trace data register to receive the first trace data byte output from the trace data register, connected to the second trace data register to receive a second trace data byte output from the second trace data register, and the third trace data register to compact the first trace data byte and the second trace data byte into adjacent bit positions of the third trace data register.

5. The hardware functional verification system of claim 4, wherein the emulation chip further comprises an error correction code generation circuit to generate an error correction code for trace data bytes to be stored in the trace array.

6. The hardware functional verification system of claim 1, wherein the trace compaction circuit comprises a plurality of multiplexers, wherein a multiplexer of the plurality of multiplexers has a plurality of data inputs configured to receive the plurality of data bits, and wherein the multiplexer has a plurality of selection inputs configured to receive the one or more enable bits to select a data input of the plurality of data inputs.

* * * * *